April 20, 1943.　　　C. C. HANSON　　　2,317,188
CULTIVATOR
Filed Aug. 3, 1940　　　2 Sheets-Sheet 1

Inventor
C. Chris Hanson
By Williamson & Williamson
Attorneys

April 20, 1943.    C. C. HANSON    2,317,188
CULTIVATOR
Filed Aug. 3, 1940    2 Sheets-Sheet 2
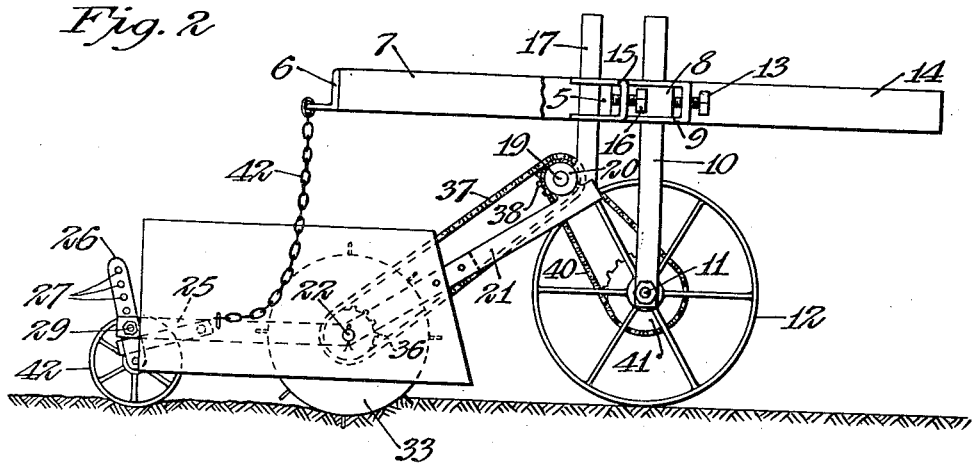
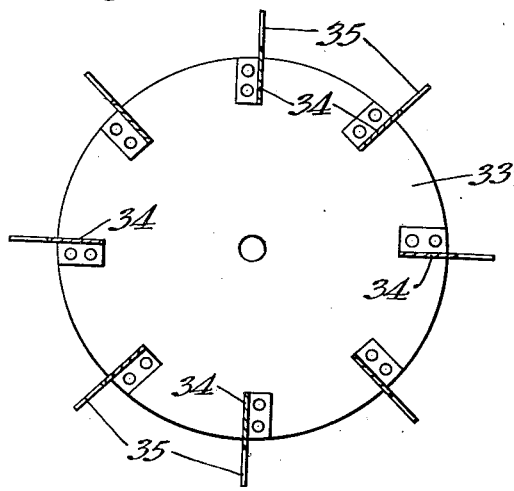
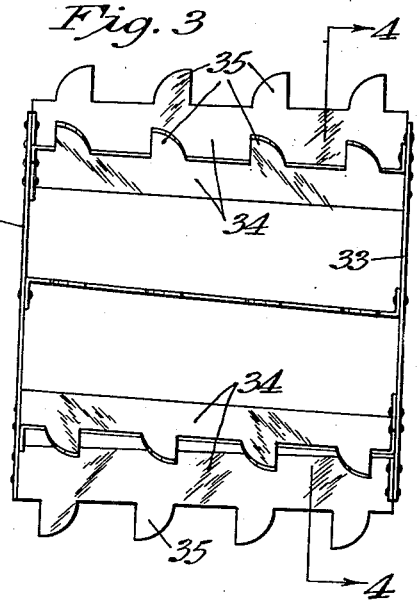
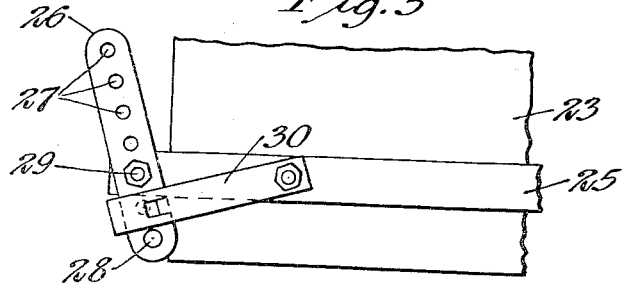
Inventor
C. Chris Hanson
By Williamson & Williamson
Attorneys Patented Apr. 20, 1943

2,317,188

UNITED STATES PATENT OFFICE 2,317,188

CULTIVATOR

Carl Chris Hanson, Albert Lea, Minn.

Application August 3, 1940, Serial No. 350,756

1 Claim. (Cl. 97—40)

This invention relates to cultivators and is particularly adapted for use in low boggy ground or in any ground which is wet and which tends to pack mud and dirt on the cultivator or to otherwise clog the same.

My cultivator has been found to be of considerable advantage for cultivating onion fields in boggy land.

One of the objects of my invention is to provide a cultivator which will effectively operate in bog lands without clogging and without packing the land in any manner. To the contrary it is intended to loosen up the land and to effectively destroy weeds between row crops.

A more specific object of the invention is to provide a plurality of rotary cultivator units made up of groups of blades wherein means is provided for driving said rotary units at a speed slightly greater than the normal rotational speed thereof when the units are not power driven and are merely pulled over the ground. This power driving feature causes the cultivator blades to cut into and through the ground to effectively loosen the same and destroy weed growth.

Another object of the invention is to provide a cultivator which can be operated close to the row crops wherein means is provided for shielding the crops from the rotary cultivating units.

Another object of the invention is to provide for a plurality of cultivator units which are independently arranged for vertical movement with respect to each other and wherein means is provided for limiting downward movement of the units so that the entire device can be elevated from the ground when turning and while transporting the device to the field.

Still another object of the invention is to provide a cultivator wherein each of the independently movable units is equipped with depth gauge means for limiting the degree of penetration of the blades into the ground.

These and other objects of the invention will more fully appear from the following description made in connection with the accompanying drawings, wherein like reference characters refer to the same parts throughout the views, and, in which:

Fig. 2 is an end view;

Fig. 3 is an enlarged plan view of one of the rotary cultivator elements;

Fig. 4 is a section taken approximately on the line 4—4 of Fig. 3; and

Fig. 5 is an enlarged fragmentary detail of the depth gauge.

Figure 1:
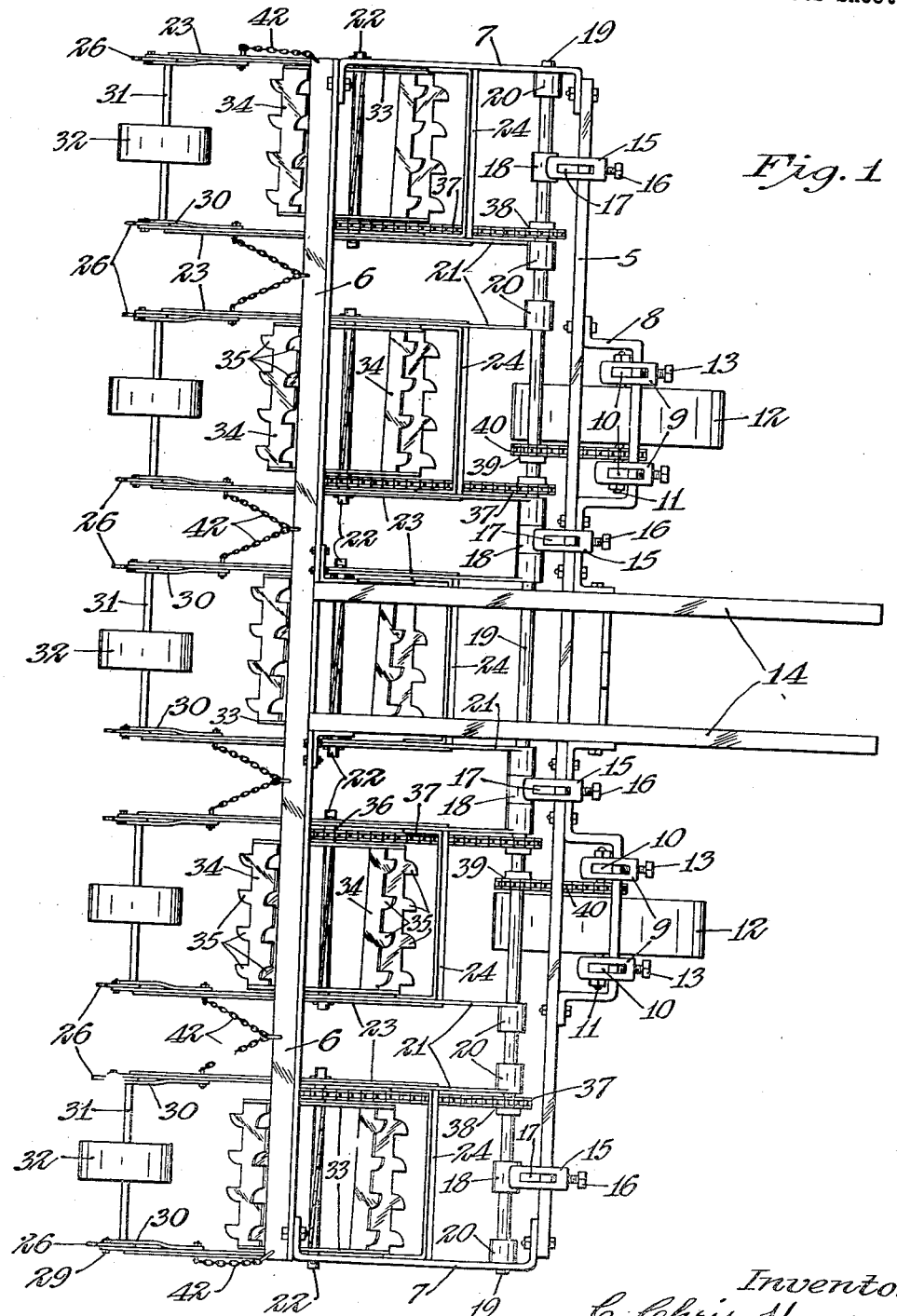
Fig. 1 is a plan view of my invention.

The frame of the device includes a pair of transversely positioned parallel bars 5 and 6 which are connected at their ends by relatively short frame members 7. The forward transverse frame member 5 carries a pair of brackets 8 which have clamps 9 adapted to slidably receive vertical posts 10. The posts 10 extend downwardly to stub axles 11 upon which are mounted round wheels 12. The brackets 9 are provided with set screws 13 to permit clamping of the vertical posts 10 between the clamps and the brackets 8. A pair of draw bar elements 14 are connected to the central portions of the frame members 5 and 6 and extend forwardly of the forward member 5 and are intended to be suitably secured to a tractor or other draft device.

A pair of clamps 15 having set screws 16 are mounted on the forward transverse frame member 5 and adapted to adjustably clamp a pair of posts 17 which extend downwardly below the frame members and at their lower ends are secured as by welding to journals 18 which support a transversely positioned power shaft 19.

Rotatably mounted on the shaft 19 is a plurality of bearing members 20 which are shown to be grouped in pairs and which have bracket arms 21 secured thereto, these arms extending downwardly and rearwardly from the power shaft 19. Pairs of these brackets 21 rotatably support short axles 22 which act as the axles for the individual cultivator units to be described in more detail below. Also connected to the bracket members 21 are vertically disposed guard plates 23 which have spacer bars 24 across their front ends. Bars 25, which are secured to the brackets 21 extend rearwardly from the drum axles 22, and secured to the rear ends of said bars are links 26 having a plurality of apertures 27 and enlarged axle receiving apertures 28, said links being adjustable vertically with respect to the rear ends of the bars 25 and secured thereto by bolts 29. Brace members 30 prevent the links 26 from tipping forwardly or rearwardly, and said links form the supports for the axles 31 upon which the depth gauge wheels 32 are mounted.

The cultivator elements per se are best illustrated by the showings in Figs. 3 and 4. Each of these elements includes a pair of discs 33 between which are supported cultivator blades 34 which are disposed at a slight angle to the rotational axis of the drum but generally in alignment with said axis, and said blades have a plurality of teeth 35 formed thereon. These blades may be riveted or welded to the discs 33. Each of the drums with its blades 34 is mounted upon the axles 22 which extend between the bars 21 extending downwardly from the power shaft 19. On each of said axles 22 is a small sprocket 36 which is connected by a chain 37 to a sprocket 38 on the power shaft 19. The power shaft 19 carries a pair of sprockets 39 adjacent the two ground wheels 12 which support the frame of the device, and said sprockets 39 are connected by chains 40 to be driven by sprockets 41 on the stub axles 11 of the ground wheels 12.

The cultivator units are prevented from dropping beyond a pre-determined point when the device is elevated in turning or transportation by means of chains 42 which extend downwardly from the rear transverse member 6. It should be noted that these chains 42 have nothing to do with the functioning of the depth gauge wheels 32.

It will be noted from Fig. 1 that my apparatus can be drawn through a field in which a row crop is growing, and the rows of the crop will lie between adjacent guard plates 23 of adjacent individual cultivator units. The crop is thus protected from the action of the toothed blades 34 on the cultivator drums. The depth of penetration of the blades 34 is controlled by any desired setting of the depth gauge wheels 32, and as the cultivator is drawn over the ground each of the cultivator units including its cultivator drum and depth gauge can move in a generally vertical direction due to irregularities in the ground entirely independently of the other units of the device. As it is drawn the ground wheels 12 which support the main frame due to their chain and sprocket connection to the power shaft 19 and each of the cultivator drums will cause said drums to rotate under power. This rotation is in the same direction as that of the ground wheels, but the speed of rotation is greater due to the particular gearing than if said drums were not power driven and merely pulled over the ground with a natural ground contact rotation. Because of this increase in the rotational speed of the drums, their toothed blades 34 will dig into the ground and dig the ground rearwardly to some extent, thus effectively breaking up the earth between the crop rows and also digging up and cutting off the roots of weed growth and exposing the roots to the sun so that they will rapidly die.

The entire frame work can be raised or lowered with respect to the ground wheels 12, and the power shaft 19 can also be vertically adjusted relative to the main frame of the apparatus.

From the foregoing description, it will be seen that I have provided a row crop cultivator adapted for use particularly in bog lands where other types of cultivators normally become clogged with mud and unfit for proper cultivation. My apparatus, however, has its cultivator elements so formed that they will dig into the ground loosening it up and destroying weeds while at the same time the toothed blades thereof, which are spaced some distance from each other and formed relatively thin, withdraw themselves from mucky soil without building up large accumulations on the blades. The apparatus is relatively light and the power for operating the cultivator drums with their toothed blades is derived from the ground wheels supporting the frame so that the apparatus can be horse drawn or can be connected to a tractor. The depth of penetration of the toothed blades can be easily controlled and other adjustments of the apparatus in general can be made as described above.

It will, of course, be understood that various changes can be made in the form, engagement, details and proportions of the various parts without departing from the scope of my invention.

What is claimed is:

In a cultivator, a transversely elongated frame having a front cross member and a spaced rear cross member, a pair of frame supporting wheels mounted for vertical adjustment on said front cross member, a transverse drive shaft extending across said frame and vertically adjustable thereon, a drive connection between one of said wheels and said drive shaft, a plurality of transversely spaced cultivator members pivotally connected to said shaft and having rotary portions with drive connections to said drive shaft, a plurality of guard plates beside said cultivator members and also pivotally connected to said shaft, ground engaging wheels for supporting said cultivator members, said wheels being rotatably connected with said guard plates, and flexible movement limiting means connected between said rear frame member and said guard plates.

CARL CHRIS HANSON.